(12) United States Patent
Dewan

(10) Patent No.: US 9,880,719 B2
(45) Date of Patent: *Jan. 30, 2018

(54) GRAPHICAL INTERFACE DATA FRAGMENT OPERATIONS FOR DATA VISUALIZATION

(71) Applicant: International Business Machines Corporation, Armonk, NY (US)

(72) Inventor: Prakash Dewan, Pune (IN)

(73) Assignee: International Business Machines Corporation, Armonk, NY (US)

(*) Notice: Subject to any disclaimer, the term of this patent is extended or adjusted under 35 U.S.C. 154(b) by 174 days.

This patent is subject to a terminal disclaimer.

(21) Appl. No.: 15/012,531

(22) Filed: Feb. 1, 2016

(65) Prior Publication Data
US 2016/0147419 A1 May 26, 2016

Related U.S. Application Data

(63) Continuation of application No. 14/489,038, filed on Sep. 17, 2014, which is a continuation-in-part of
(Continued)

(51) Int. Cl.
*G06F 3/0484* (2013.01)
*G06F 3/0481* (2013.01)
(Continued)

(52) U.S. Cl.
CPC ........ *G06F 3/04842* (2013.01); *G06F 3/0481* (2013.01); *G06F 3/0482* (2013.01);
(Continued)

(58) Field of Classification Search
CPC ....... G06F 3/0484; G06F 3/0482; G06T 11/20
See application file for complete search history.

(56) References Cited

U.S. PATENT DOCUMENTS

| 5,623,282 A * | 4/1997 | Graham | G06F 3/0486 345/672 |
| 6,112,214 A * | 8/2000 | Graham | G06F 3/0486 345/660 |

(Continued)

FOREIGN PATENT DOCUMENTS

WO  2012128650 A1  9/2012

OTHER PUBLICATIONS

Office Action from U.S. Appl. No. 14/686,051, dated Sep. 14, 2016, 14 pp.
(Continued)

*Primary Examiner* — David Choi
(74) *Attorney, Agent, or Firm* — Shumaker & Sieffert, P.A.

(57) ABSTRACT

Techniques are described for providing visualizations of data with options for a user to manipulate the data visualizations. These data visualization options may provide flexible and rapid comparison of different fragments of data. In one example, a method includes outputting a display of a data visualization in a graphical user interface. The method further includes receiving a first user input selecting a first fragment of the data visualization to freeze. The method further includes receiving a second user input selecting a second fragment of the data visualization to reposition to a new position relative to the frozen fragment of the data visualization. The method further includes outputting a revised display of the data visualization in the graphical user interface that displays the repositioned fragment of the data visualization in the new position relative to the frozen fragment of the data visualization.

20 Claims, 8 Drawing Sheets

Related U.S. Application Data application No. 13/835,825, filed on Mar. 15, 2013, now Pat. No. 9,239,670.

(51) Int. Cl.

| | | |
|---|---|---|
| *G06F 17/24* | (2006.01) | |
| *G06Q 10/06* | (2012.01) | |
| *G06F 3/0482* | (2013.01) | |
| *G06T 11/20* | (2006.01) | |

(52) U.S. Cl.
CPC ........ *G06F 3/04845* (2013.01); *G06F 17/245* (2013.01); *G06Q 10/067* (2013.01); *G06T 11/206* (2013.01)

(56) References Cited

U.S. PATENT DOCUMENTS

| | | | |
|---|---|---|---|
| 6,460,059 B1 * | 10/2002 | Wisniewski | G06F 17/246 715/205 |
| 6,995,768 B2 | 2/2006 | Jou et al. | |
| 8,176,096 B2 | 5/2012 | Allyn et al. | |
| 8,239,765 B2 | 8/2012 | Alsbury et al. | |
| 8,407,737 B1 | 3/2013 | Ellis | |
| 8,812,947 B1 * | 8/2014 | Maoz | G06F 17/246 715/212 |
| 8,990,727 B2 | 3/2015 | Xia et al. | |
| 9,239,670 B2 | 1/2016 | Dewan | |
| 2003/0164817 A1 * | 9/2003 | Graham | G06F 3/0486 345/157 |
| 2008/0072164 A1 * | 3/2008 | Park | G06F 17/227 715/762 |
| 2009/0300544 A1 | 12/2009 | Psenka et al. | |
| 2009/0319948 A1 * | 12/2009 | Stannard | G06F 8/34 715/810 |
| 2010/0100805 A1 * | 4/2010 | Williams | G06F 17/241 715/230 |
| 2012/0023438 A1 | 1/2012 | Xia et al. | |
| 2012/0144325 A1 | 6/2012 | Mital et al. | |
| 2012/0218254 A1 | 8/2012 | Abeln | |
| 2012/0246599 A1 | 9/2012 | Rivas Casado et al. | |
| 2013/0167091 A1 * | 6/2013 | Klappert | G06F 3/0481 715/849 |
| 2014/0282145 A1 * | 9/2014 | Dewan | G06F 3/04842 715/765 |
| 2015/0007011 A1 | 1/2015 | Dewan | |
| 2015/0015504 A1 | 1/2015 | Lee et al. | |

OTHER PUBLICATIONS

Notice of Allowance from U.S. Appl. No. 14/686,051 dated Apr. 12, 2017, 7 pp.

Amendment in Response to Office Action dated Mar. 15, 2017, from U.S. Appl. No. 14/686,051, filed Mar. 23, 2017, 11 pp.

Notice of Allowance from U.S. Appl. No. 14/489,038, dated Mar. 14, 2016, 9 pp.

Final Office Action from U.S. Appl. No. 14/686,051, dated Mar. 15, 2017, 7 pp.

Amendment in Response to Office Action dated Sep. 14, 2016, from U.S. Appl. No. 14/686,051, filed Dec. 14, 2016, 24 pp.

"List of IBM Patents or Patent Applications Treated as Related," Appendix P, 2 pp.

Keim et al. "Visual Analytics: Definition, Process, and Challenges", A. Kerren et al. (Eds.): Information Visualization, LNCS 4950, pp. 154-175, 2008.

Miller et al. "Orchestrating Data, Design, and Narrative: Information Visualization for Sense- and Decision-Making in Online Learning", International Journal of Cyber Behavior, Psychology and Learning, 2(2), 1-15, Apr.-Jun. 2012, IGI Global, 3 pgs.

U.S. Appl. No. 14/686,051, filed Apr. 14, 2015, by Illse M. Breedvelt-Schouten et al.

Tanaka, c3.js—D3-based reusable chart library, Retrieved from <c3js.org/samples/options_subchart.html> and <c3js.org/reference.html> on Apr. 16, 2015, 5 pgs.

* cited by examiner

GRAPHICAL INTERFACE DATA FRAGMENT OPERATIONS FOR DATA VISUALIZATION

This application is a continuation of U.S. patent application Ser. No. 14/489,038, filed Sep. 17, 2014, which is a continuation of U.S. patent application Ser. No. 13/835,825, filed Mar. 15, 2013, the entire content of each of which is incorporated by reference herein.

TECHNICAL FIELD

The invention relates to business intelligence systems, and more particularly, to dashboard environments for business intelligence systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by many users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

Visualization tools may allow users to visualize business intelligence data. Visualization tools may make use of charts and graphs to represent sets of data. Typically, a data visualization tool may be used to visualize data in accordance with filters or parameters defined by user inputs via a data filter definition interface.

SUMMARY

In general, examples disclosed herein are directed to techniques for effective or rapid comparison of fragments of data representations.

In one example, a method includes outputting, by a computing device, a display of a data visualization in a graphical user interface. The method further includes receiving, by the computing device, a first user input selecting a first fragment of the data visualization to freeze, thereby defining a frozen fragment of the data visualization, wherein the first user input is entered via a pointer positioned at the first fragment of the data visualization in the display of the data visualization in the graphical user interface. The method further includes receiving, by the computing device, a second user input selecting a second fragment of the data visualization to reposition to a new position relative to the frozen fragment of the data visualization, thereby defining a repositioned fragment of the data visualization, wherein the second user input is entered via a pointer positioned at the second fragment of the data visualization in the display of the data visualization in the graphical user interface. The method further includes outputting, by the computing device, a revised display of the data visualization in the graphical user interface that displays the repositioned fragment of the data visualization in the new position relative to the frozen fragment of the data visualization.

In another embodiment, a computing system includes one or more processors, and computer-executable program instructions, for execution by the one or more processors. The computing system further includes program instructions for outputting a display of a data visualization in a graphical user interface. The computing system further includes program instructions for receiving a first user input selecting a first fragment of the data visualization to freeze, thereby defining a frozen fragment of the data visualization, wherein the first user input is entered via a pointer positioned at the first fragment of the data visualization in the display of the data visualization in the graphical user interface. The computing system further includes program instructions for receiving a second user input selecting a second fragment of the data visualization to reposition to a new position relative to the frozen fragment of the data visualization, thereby defining a repositioned fragment of the data visualization, wherein the second user input is entered via a pointer positioned at the second fragment of the data visualization in the display of the data visualization in the graphical user interface. The computing system further includes program instructions for outputting a revised display of the data visualization in the graphical user interface that displays the repositioned fragment of the data visualization in the new position relative to the frozen fragment of the data visualization.

In another embodiment, a non-transitory computer-readable storage medium includes executable instructions stored thereon. The executable instructions may configure one or more programmable processors to output a display of a data visualization in a graphical user interface. The executable instructions may further configure one or more programmable processors to receive a first user input selecting a first fragment of the data visualization to freeze, thereby defining a frozen fragment of the data visualization, wherein the first user input is entered via a pointer positioned at the first fragment of the data visualization in the display of the data visualization in the graphical user interface. The executable instructions may further configure one or more programmable processors to receive a second user input selecting a second fragment of the data visualization to reposition to a new position relative to the frozen fragment of the data visualization, thereby defining a repositioned fragment of the data visualization, wherein the second user input is entered via a pointer positioned at the second fragment of the data visualization in the display of the data visualization in the graphical user interface. The executable instructions may further configure one or more programmable processors to output a revised display of the data visualization in the graphical user interface that displays the repositioned fragment of the data visualization in the new position relative to the frozen fragment of the data visualization.

The details of one or more embodiments of the invention are set forth in the accompanying drawings and the description below. Other features, objects, and advantages of the invention will be apparent from the description and drawings, and from the claims.

DETAILED DESCRIPTION

Various examples are disclosed herein for a data visualization tool for data comparison operations in a data visualization.

Figure 1:
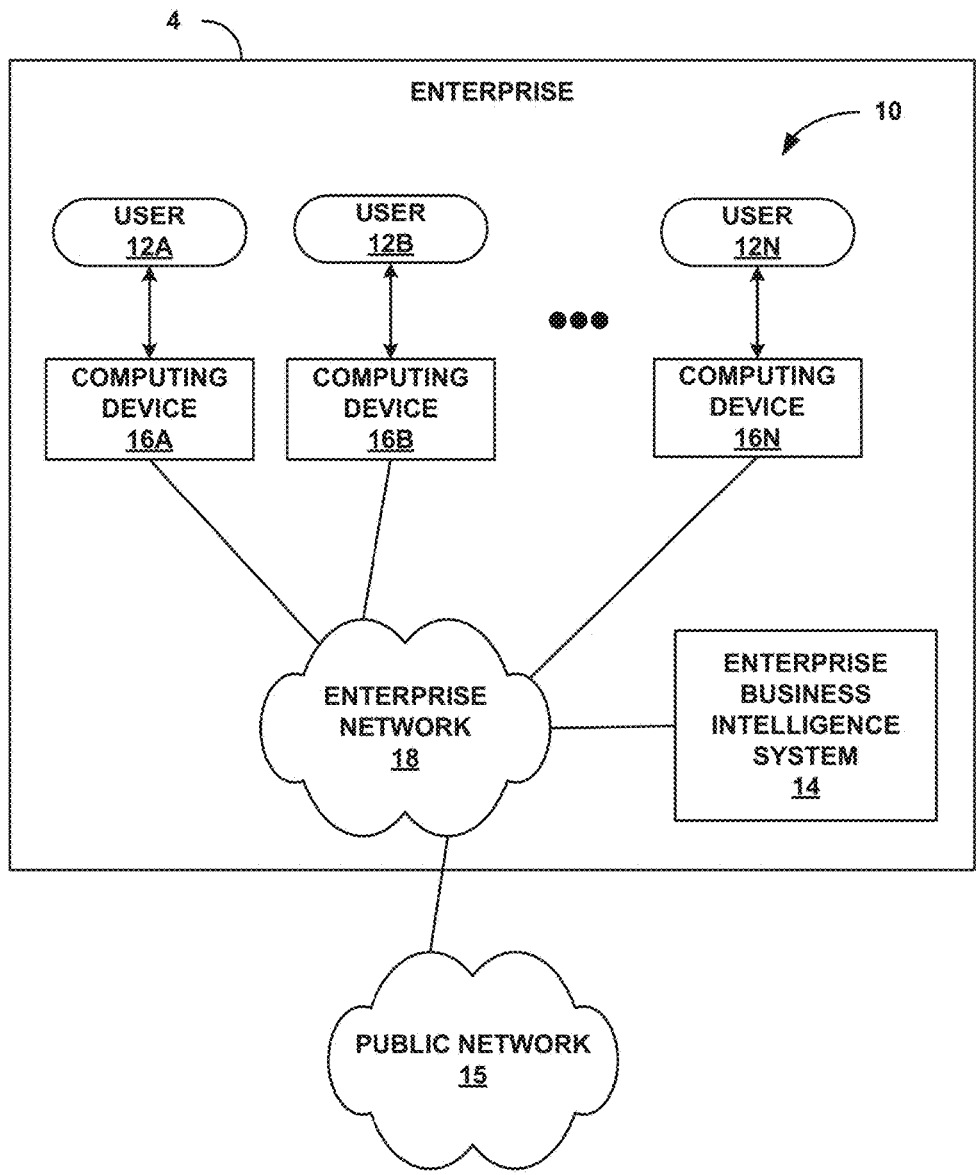
FIG. 1 is a block diagram illustrating an example enterprise having a computing environment in which users interact with an enterprise business intelligence system and data sources accessible over a public network.

FIG. 1 illustrates an example context in which a system of this disclosure may be used. FIG. 1 is a block diagram illustrating an example enterprise 4 having a computing environment 10 in which a plurality of users 12A-12N (collectively, "users 12") may interact with an enterprise business intelligence (BI) system 14. In the system shown in FIG. 1, enterprise business intelligence system 14 is communicatively coupled to a number of client computing devices 16A-16N (collectively, "client computing devices 16" or "computing devices 16") by an enterprise network 18. Users 12 interact with their respective computing devices to access enterprise business intelligence system 14. Users 12, computing devices 16A-16N, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In this example, enterprise BI system 14 includes servers that run BI dashboard web applications and may provide business analytics software. A user 12 may use a BI portal on a client computing device 16 to view and manipulate information such as business intelligence reports ("BI reports") and other collections and visualizations of data via their respective computing devices 16. This may include data from any of a wide variety of sources, including from multidimensional data structures and relational databases within enterprise 4, as well as data from a variety of external sources that may be accessible over public network 15.

Users 12 may use a variety of different types of computing devices 16 to interact with enterprise business intelligence system 14 and access data visualization tools and other resources via enterprise network 18. For example, an enterprise user 12 may interact with enterprise business intelligence system 14 and run a business intelligence dashboard using a laptop computer, a desktop computer, or the like, which may run a web browser. Alternatively, an enterprise user may use a smartphone, tablet computer, or similar device, running a business intelligence dashboard in either a web browser or a dedicated mobile application for interacting with enterprise business intelligence system 14.

Enterprise network 18 and public network 15 may represent any communication network, such as a packet-based digital network such as a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
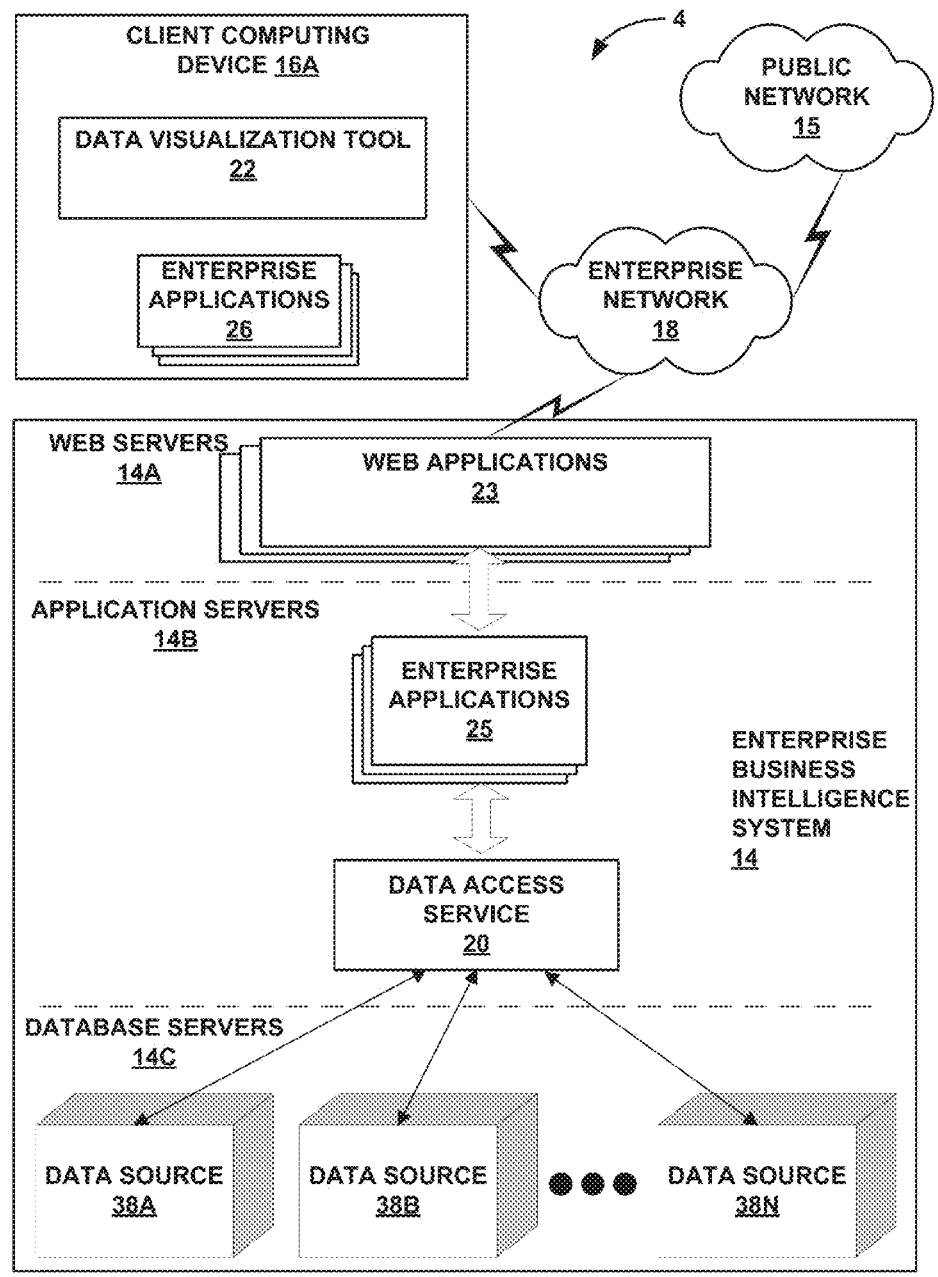
FIG. 2 is a block diagram illustrating one embodiment of an enterprise business intelligence system with a client computing device running a business intelligence dashboard with various pattern representation images for business intelligence dashboard objects.

FIG. 2 is a block diagram illustrating in further detail portions of one embodiment of an enterprise business intelligence (BI) system 14. In this example implementation, a single client computing device 16A is shown for purposes of example and includes a data visualization tool 22 and one or more client-side enterprise software applications 26 that may utilize and manipulate multidimensional data, including to generate data visualizations with data visualization tool 22. Data visualization tool 22 may be rendered within a general web browser application, within a locally hosted application or mobile application, or other user interface. Data visualization tool 22 may be generated or rendered using any combination of application software and data local to the computing device it's being generated on, and remotely hosted in one or more application servers or other remote resources.

Data visualization tool 22 may output data visualizations for a user to view and manipulate in accordance with various techniques described in further detail below. Data visualization tool 22 may present data in the form of charts or graphs that a user may manipulate, for example. Data visualization tool 22 may present visualizations of data based on data from sources such as a BI report, e.g., that may be generated with enterprise business intelligence system 14, or another BI dashboard, as well as other types of data sourced from external resources through public network 15. Data visualization tool 22 may present visualizations of data based on data that may be sourced from within or external to the enterprise.

FIG. 2 depicts additional detail for enterprise business intelligence system 14 and how it may be accessed via interaction with a data visualization tool 22 for depicting and providing visualizations of business data. Data visualization tool 22 may provide visualizations of data that represents, provides data from, or links to any of a variety of types of resource, such as a BI report, a software application, a database, a spreadsheet, a data structure, a flat file, Extensible Markup Language ("XML") data, a data stream, unorganized text or data, or other type of file or resource.

As depicted in FIG. 2, enterprise business intelligence system 14 is implemented in accordance with a three-tier architecture: (1) one or more web servers 14A that provide web applications 23 with user interface functions, including a BI dashboard application 21; (2) one or more application servers 14B that provide an operating environment for enterprise software applications 25 and a data access service 20; and (3) database servers 14C that provide one or more data sources 14C. The data sources 14C may include two-dimensional databases and/or multidimensional databases, i.e. cubes. The data sources may be implemented using a variety of vendor platforms, and may be distributed throughout the enterprise. As one example, the data sources 14C may be multidimensional databases configured for Online Analytical Processing (OLAP). As another example, the data sources 14C may be multidimensional databases configured to receive and execute Multidimensional Expression (MDX) queries of some arbitrary level of complexity. As yet another example, the data sources 14C may be two-dimensional relational databases configured to receive and execute SQL queries, also with an arbitrary level of complexity.

Multidimensional data structures are "multidimensional" in that each multidimensional data element is defined by a plurality of different object types, where each object is associated with a different dimension. The enterprise applications 26 on computing device 16A may issue business queries to enterprise business intelligence system 14 to build reports. Enterprise business intelligence system 14 includes a data access service 20 that provides a logical interface to the data sources 14C. Client computing device 16A may transmit query requests through enterprise network 18 to data access service 20. Data access service 20 may, for example, execute on the application servers intermediate to the enterprise applications 25 and the underlying data sources in database servers 14C. Data access service 20 retrieves a query result set from the underlying data sources, in accordance with query specifications. Data access service 20 may intercept or receive queries, e.g., by way of an API presented to enterprise applications 26. Data access service 20 may then return this result set to enterprise applications 26 as BI reports, other BI objects, and/or other sources of data that are made accessible to data visualization tool 22 on client computing device 16A.

Data visualization tool 22 may provide data visualizations for a multidimensional data structure, a database, an external web application, or other data source, and provide access to or be populated or defined by a corresponding data source. Data visualization tool 22 may provide representations or visualizations of data from multidimensional data structures, databases, or other data sources. Data visualization tool 22 may provide representations or visualizations of data categorized among multiple dimensions such as geographical areas, product categories, sales channels, currencies, and various financial metrics such as unit sales, costs, revenues, profits, and margins, for example.

In a visualization with a substantial amount of data (e.g., a bar chart or a column chart that represents many data points), it may become difficult for a user to compare representations of multiple data points (as represented by data fragments or fragments of the data visualization, e.g., columns of a column chart, bars of a bar chart, slices of a pie chart, or any other set of one or more elements of a data visualization) spread out among the chart. It may require considerable time and effort for a business user to make sense out of a visualization, when the user is specifically looking to make decisions based on comparisons between specific data points or subsets of data as represented within a larger data visualization. Specifying filters on the data, such as measure, dimension, and categorical filters, may require a user to go into a separate data view to select data sets of interest. After a user specifies filters, if a user decides to bring in additional data points for comparison, the user may need to go back to the filter definition and update it accordingly. This requires the user to alternate between a graphical user interface to view and analyze the data visualization, and a filter definition interface to filter or otherwise alter the parameters of the data visualization, and to continue alternating between these two interfaces as many times as the user may want to alternate between viewing the data visualization and modifying its parameters.

A user may want to compare multiple particular data fragments from among a larger set of data fragments in a data visualization, such as a chart or graph. (A data fragment may be any representation of one or more data points in a data visualization, such as one or more data columns in a column chart, one or more data bars in a bar chart, or one or more pie slices in a pie chart, for example.) There may be instances in which, even after filtering the data (such as with a measure filter, e.g., all weeks where sales are below $50,000 in a sales data visualization), the data fragments that need to be compared may fall far across disparate sections of a data visualization. This may make it difficult for the user to compare the data values of interest.

Data visualization tool 22 may resolve these issues and provide faster and easier comparison of data fragments across different sections of a data visualization (e.g., a chart or graph) by allowing a user to filter or modify the parameters of a data visualization directly in a graphical user interface in which the data visualization is displayed. For example, data visualization tool 22 may enable a user to isolate or "freeze" one or more data fragments (e.g., data columns of a column chart) of the data visualization and manipulate the positions of one or more data fragments relative to one or more frozen data fragments within the data visualization. In one example, a user may collect multiple data fragments or portions of interest from separate portions of a data visualization and reposition the data fragments adjacent to each other. This may provide easier visual comparison of the data fragments, while also maintaining information on the context of the data fragments within the greater data set. Such repositioning of data fragments may facilitate analysis of the data and decision-making based on the data. Freezing a data fragment may, in various examples, include freezing a portion of a data column chart from one edge of the chart to a selected data column, or only a selected data column in isolation. Aspects of examples such as these are further described below.

As another example of an option for manipulating a data visualization, data visualization tool 22 may enable a user to drag a data fragment in superposition with (e.g., on top of) another frozen data fragment to see the delta (i.e. the difference) between the measure values of the two data fragments. Data visualization tool 22 may enable the dragging feature by enabling the second user input, for selecting the second fragment of the data visualization to reposition to a new position relative to the frozen fragment, by receiving a left-click input while the pointer is positioned at the second fragment of the data visualization, and displaying the second fragment in a modified position that corresponds to a modified position of the pointer. For example, the user may position a mouse pointer on top of a fragment of the data visualization (e.g., a data column in a column chart), enter and hold a left-click input, then move the pointer while continuing to hold the left-click, and data visualization tool 22 may respond by displaying the selected fragment in a modified position that corresponds to the position of the pointer as the user moves (or modifies the position of) the pointer to a new position of the data visualization. Data visualization tool 22 may repetitively or practically continuously reposition the dragged fragment along with the pointer as long as the user continues to drag the selected fragment, until the user enters another input (e.g., releases a left-click button) to release the data fragment from being dragged or repositioned.

Data visualization tool 22 may therefore enable interactive visualization of data that may allow users to perform effective comparisons between different data fragments of a data visualization. In particular, data visualization tool 22 may enable a computing device to receive a first user input selecting a portion of a data visualization to freeze, thereby defining a frozen portion of the data visualization, wherein the first user input is entered via a pointer positioned at the selected portion of the data visualization in the display of the data visualization in the graphical user interface. Data visualization tool 22 may similarly enable a computing device to receive a second user input selecting a portion of the data visualization to reposition to a new position relative to the frozen portion of the data visualization, thereby defining a repositioned portion of the data visualization, wherein the second user input is entered via a pointer positioned at the portion of the data visualization selected for repositioning in the graphical user interface.

The pointer input may include a mouse navigation pointer or cursor positioned on top of a graphical data element in a data visualization, such as a column (e.g., a data column graphically representing a data point) in a column chart, or a pie slice (e.g., a data pie slice graphically representing a data point) in a pie chart, for example. The pointer input may also include a touch contact on the position of a graphical data element on a touchscreen, or an input with a pointer navigated via a touchpad, trackball, joystick, or any other navigational input device. The pointer input may also include a right-click to call up a context menu while the pointer is placed on top of or in superposition with the graphical data element, and a menu option selection from the context menu (such as to freeze the graphical data element), such that the menu option selection is applied to the graphical data element on which the pointer is superposed. The pointer input may also include a left-click on a graphical data element on which the pointer is superposed (e.g., to select a graphical data element) or a motion with a pointer while a selector input mechanism is maintained (e.g., a left-click button is held down while a pointer is moved with a mouse to drag a data element).

Data visualization tool 22 may thus enable user inputs directly on graphical data elements in a data visualization to perform operations that otherwise might require alternating to a filter definition interface, separate from a graphical user interface in which a data visualization is displayed. Data visualization tool 22 may thereby make the process of interacting with a data visualization simpler, faster, and more intuitive.

Data visualization tool 22 may enable the ability to freeze and/or manipulate data fragments in any of various ways. For example, data visualization tool 22 may provide a context menu option to select (e.g., with a right-click) a data fragment in visualization to freeze, or a toolbar or menu option followed by selecting (e.g., by left-clicking on) a data fragment. Data visualization tool 22 may enable dragging a data fragment in a "drag to compare" option, for example as a context menu option with right-click on a data point in visualization, or a toolbar option followed by data fragment selection on click. A drag to compare operation may also treat non-frozen data fragments in a visualization as a circular set when the user repositions one or more non-frozen data fragments within the set, to maintain context among the data fragments, as explained in more detail below.

A drag to compare option of data visualization tool 22 may also enable a superposed delta view of data fragments, in which a user may drag a data fragment in superposition with or on top of a frozen data fragment and highlight the delta or difference between the dragged data point and the frozen fragment, for example. Data visualization tool 22 may use any of various means, such as displaying different colors or opacities, to highlight a delta between a dragged data fragment and a frozen data fragment that a user superposes together. A delta may be highlighted in pre-defined colors for different meanings. For example, the delta may be highlighted in green in a chart or graph if the value of the dragged data fragment is higher than that of the frozen data fragment on which it is superposed, and in red if the value of the dragged data point is lower than that of the frozen data fragment on which it is superposed. Data visualization tool 22 may render deltas between dragged data fragments and frozen data fragments in any other colors, shades, opacities, or other visual indications, with different options showing a dragged data fragment as either higher or lower than a frozen data fragment, or in some other comparative relationship with a frozen data fragment.

A delta can be shown as a positive number with information on the data fragments (e.g., category labels). The difference in values may be stated explicitly as well as visually indicated, such as according to the formula:

$$\Delta = Dd - Df \qquad \text{(Eq. 1)}$$

where $\Delta$ is the delta or difference between the values of the data fragments, Dd is the value of the data fragment on top (e.g., of the dragged data fragment), and Df is the value of the data point below (e.g., of the frozen data fragment). Data visualization tool 22 may also provide options that enable a user to freeze multiple data fragments and/or to drag multiple data fragments in a visualization. A delta may be calculated and displayed for single values for data fragments representing single data points, or for an array of values for data fragments representing multiple data points, for example.

Data visualization tool 22 may also provide options to release frozen data fragments and return the data visualization to an earlier state of manipulation or to its original state. In this case, data visualization tool 22 may receive a user input selecting a frozen fragment to release from freezing, and data visualization tool 22 may output a new revised display of the data visualization in the graphical user interface that displays the data visualization in an earlier state prior to the freezing of the frozen fragment, or in a state as is the freezing had not taken place, in some examples. In particular, data visualization tool 22 may output a new revised display of the data visualization in the graphical user interface that displays the repositioned fragment and the frozen fragment in positions in the data visualization previously occupied by the repositioned fragment and the frozen fragment prior to the freezing of the frozen fragment. In case of inputs to release multiple frozen fragments, this may also involve returning a data visualization to a state in which data visualization tool 22 may return multiple frozen fragments and/or repositioned fragments to their previous positions prior to freezing and/or repositioning, potentially back to the original state of the data visualization prior to any freezing or repositioning.

Figure 3:
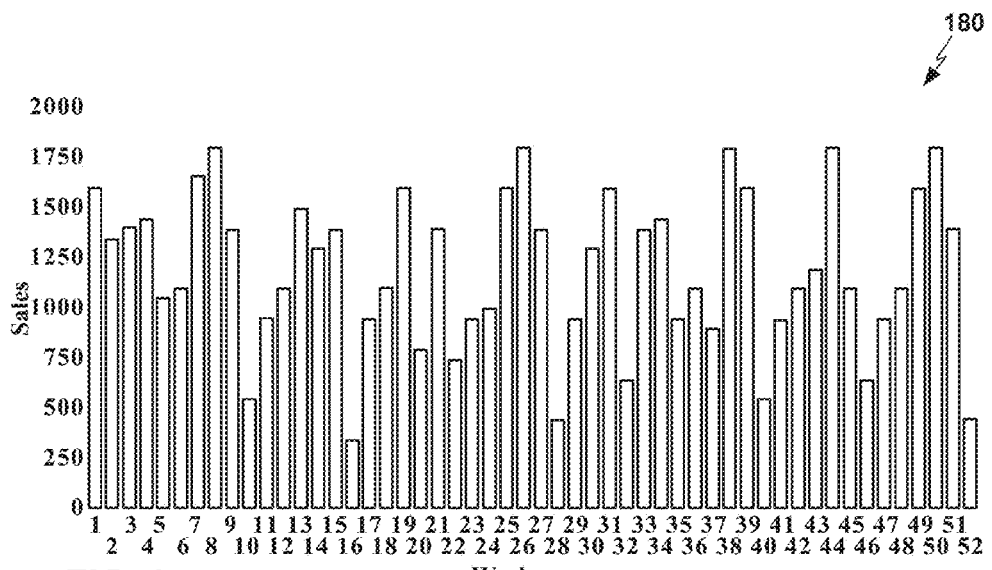
FIG. 3 depicts a column chart business data visualization in an originally presented view.

FIGS. 3-7 demonstrate examples of a data visualization subject to data fragment comparison operations enabled by data visualization tool 22. In this example, data visualization tool 22 displays a column chart representing weekly sales volume data for a one-year period from a selected portion of sales channels, as a representative business use case. FIG. 3 shows a column chart 180 of the one-year data set as it may be originally provided, prior to any comparison manipulations. Starting from the view of FIG. 3, a user may, as an illustrative example, wish to compare sales made in weeks 9, week 19 and week 34 of the one-year period, as represented in the form of data columns or data fragments in column chart 180. To do so, the user may manipulate column chart 180 using an implementation of data visualization tool 22.

Figure 4:
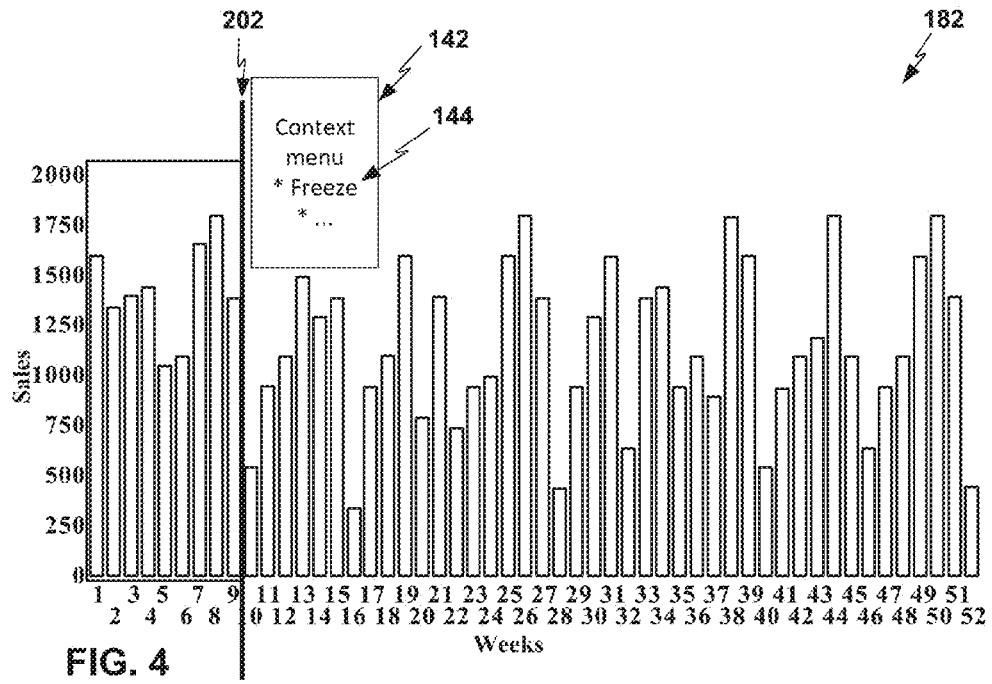
FIGS. 4-7 depict column chart business data visualizations being subjected to various freezing and dragging data comparison operations.

To begin, data visualization tool 22 may enable the user to freeze the week 9 data column in column chart 180 by a specific user input, such as inputs to right click on the week 9 data column to call up a context menu 142, and then to select a "freeze" option 144 on the context menu, as one example. FIG. 4 depicts a revised column chart 182 after the user freeze input on week 9, with a visual indicator 202 of the boundary between the frozen portion of the chart (weeks 1-9) and the portion or fragment of the chart that remains non-frozen (weeks 10-52).

Figure 5:
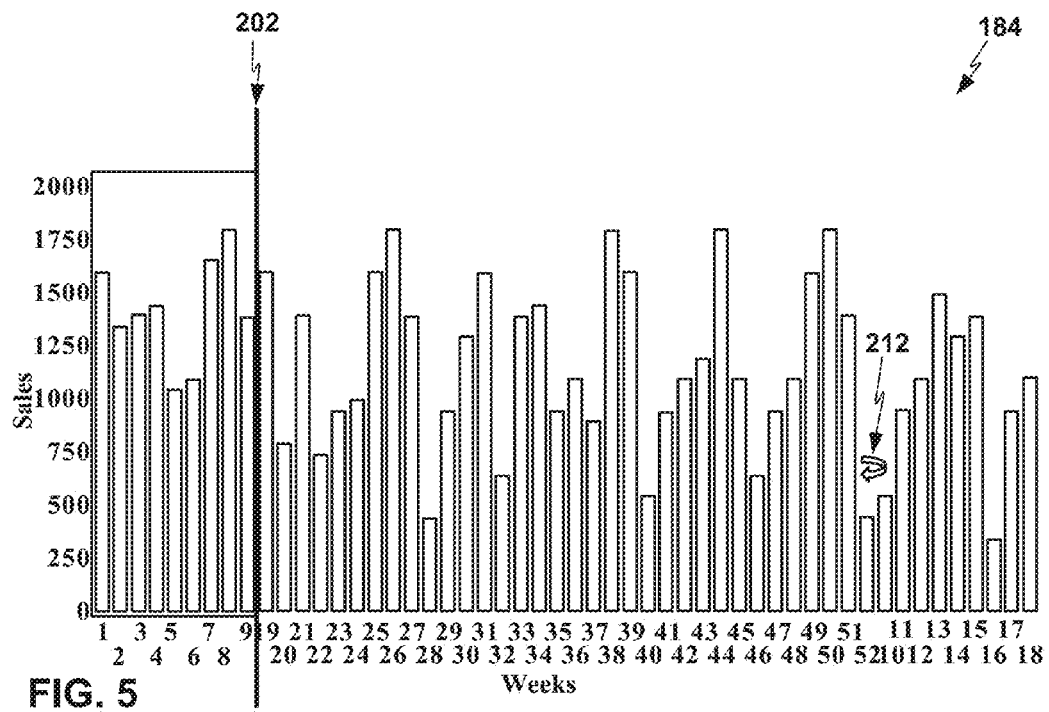

Data visualization tool 22 may enable the user to then perform a "drag to compare" operation on the week 19 data column to bring it next to the week 9 data column by another specific user input, such as inputs to left-click-and-hold on the week 19 data column with a pointer, and then to reposition the pointer while continuing to hold the left-click input, thereby dragging data column 19 across column chart 182, as one example. FIG. 5 depicts a newly revised column chart 184 after the drag to compare operation on the week 19 data column to bring it next to the week 9 data column in the column chart. As shown in newly revised column chart 184, data visualization tool 22 has enabled the user to reposition the week 19 data column immediately adjacent to the week 9 data column, making visual comparison between these two data points easier than when they are separated across different portions of the column chart with many intervening data columns between them, as in the original column chart 180.

As revised column chart 184 also shows, the data columns throughout the non-frozen section or fragment of the column chart (i.e., for weeks 10-52) may be treated as a cycle that circulates between the boundary 202 with the frozen portion of the column chart (between weeks 9 and 10) through the opposing end of the chart (week 52), so that as the week 19 data column is dragged to adjacency with week 9, the data columns from week 10 through week 18 are recirculated to the end of the chart, after week 52. Data visualization tool 22 may also introduce a visual marker 212 (or visual indication) to revised column chart 184 to indicate the position of the join between the two ends of the cycled, unfrozen portion of the column chart 184, representing the circular portion of the data set formed outside the boundary of the portion selected by the user for freezing. Visual marker 212 thereby indicates the position of a join in the data visualization, where fragments of a portion of the data visualization that remain non-frozen and were previously positioned at opposing ends of a non-frozen portion of the data visualization are positioned adjacent to each other. Visual marker 212 thereby may provide additional context information on the data fragments and their relation to each other, that may help the user visualize the relationships among the data fragments during operations to manipulate the data visualization.

Figure 6:
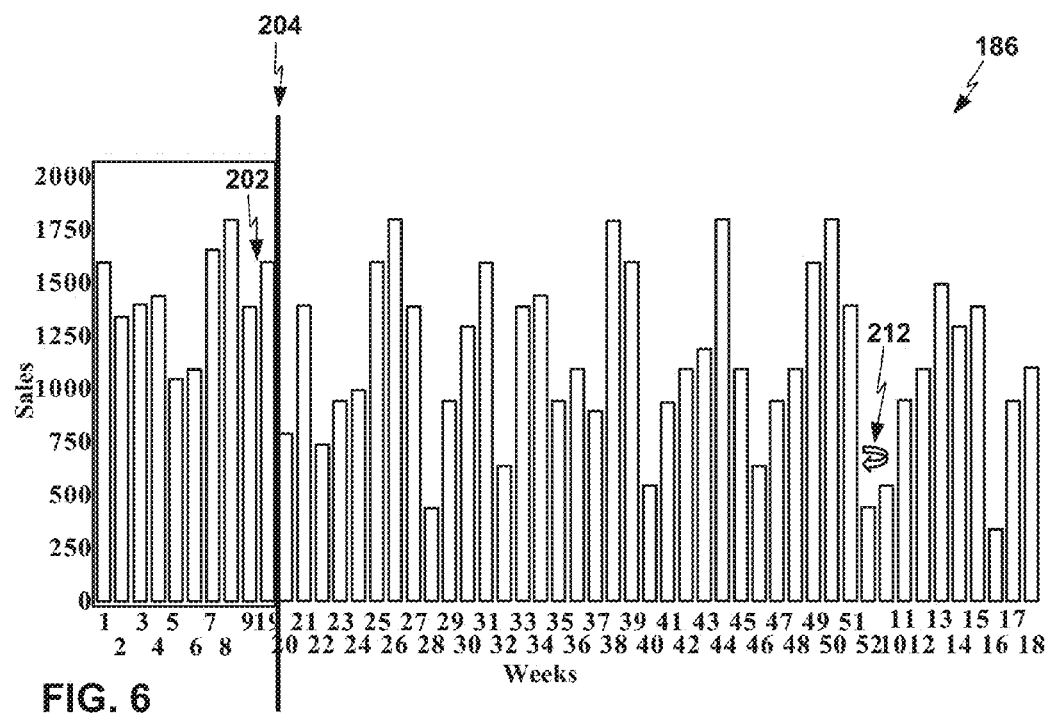

Data visualization tool 22 may enable the user to then freeze the week 19 data column, and then do a drag to compare operation on week 34 to bring it next to the week 19 data column. Data visualization tool 22 may in some examples enable these operations on column chart 184 through similar user inputs to those described above, such as a right-click on a data column to open a context menu with a freeze option, and a left-click-and-hold to drag a data column and cycle the non-frozen portion of the column chart. Data visualization tool 22 may respond to the user inputs for the operation of freezing the week 19 data column by first displaying another newly revised column chart 186, as shown in FIG. 6, in which a new boundary 204 is displayed between the newly frozen data column for week 19 (on the left of boundary 204) and the still non-frozen data column for week 20 (on the right of boundary 204). FIG. 6 also indicates, for comparison, the position 202 of the prior boundary (no longer displayed in the view of FIG. 6) between the frozen and non-frozen portions of the column chart previous to the user input to freeze the week 19 data column. Revised column chart 186 also still shows visual marker 212 to indicate the position of the join between the two ends of the cycled, still unfrozen portion of the column chart 186, which is unaffected by the freeze operation on the week 19 data column.

Figure 7:
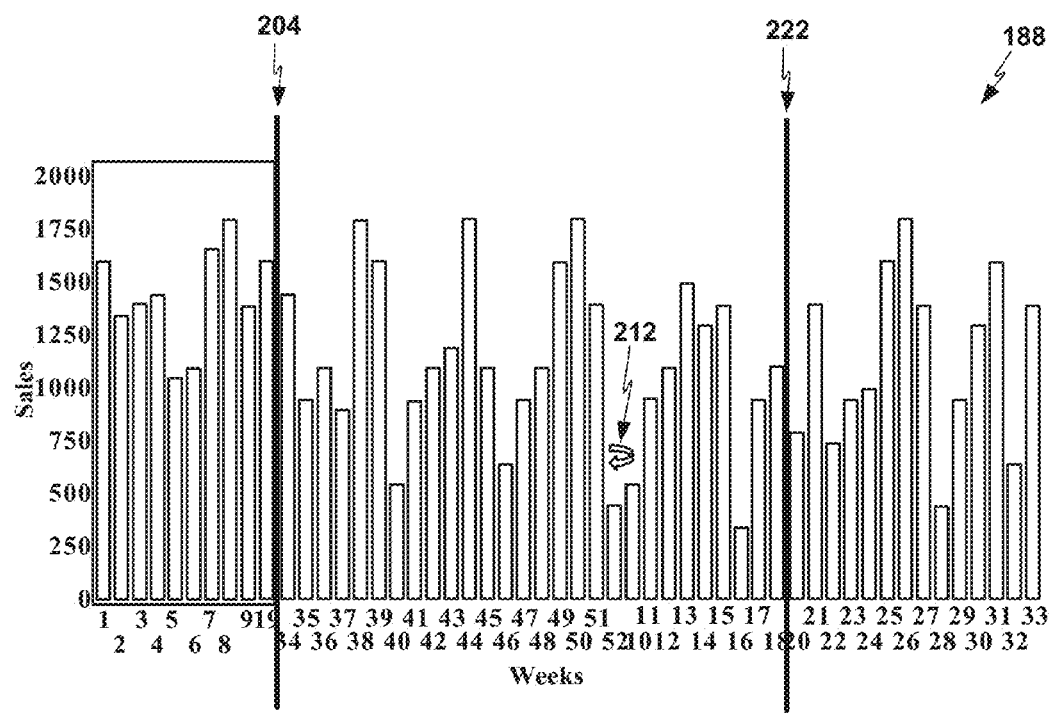

Data visualization tool 22 may then respond to the user inputs for the drag to compare operation on week 34 to bring it next to the week 19 data column, by displaying another newly revised column chart 188 as shown in FIG. 7. In the view of FIG. 7, data visualization tool 22 has responded to the user input for the operation of dragging the week 19 data column by displaying another newly revised column chart 188. Column chart 188 displays the week 34 data column positioned immediately adjacent to the week 19 data column, on either side of boundary 204 between the frozen and unfrozen portions of the chart. Thus, the data columns for all three of weeks 9, 19, and 34 are positioned in a group immediately adjacent one next to the other, without other data columns intervening between them.

Newly revised column chart 188 created by data visualization tool 22 thereby enables the user to compare the sales data for these three weeks of interest (9, 19, and 34) directly with each other, instead of trying to visualize a comparison among these multiple weeks of interest across widely separated positions of the column chart. In data visualizations with larger data sets and/or a larger number of particular data values of interest than in this example, the capabilities provided by data visualization tool 22 of this disclosure may become all the more useful in facilitating such data comparisons.

Newly revised column chart 188 of FIG. 7 also still displays marker 212 for the join of the unfrozen data portions, now repositioned along with the new position of the join between the week 52 and week 10 data columns, due to the dragging of the unfrozen portion of the column chart along with the dragging of the week 34 data column. The dragging of the unfrozen portion of the column chart has also resulted in the week 20 through week 33 data columns being recirculated, from between the frozen portion boundary 204 and the week 34 data column (as in column chart 186 in FIG. 6), to the opposing end of the column chart 188. Another visual marker or visual indication 222 may, in some examples, also be rendered to mark the discontinuity between data columns 18 and 20, due to the previous freezing of the week 19 data column and subsequent operations leaving the weeks 18 and 20 data columns adjacent to each other in the recirculated portion of the column chart.

Visual marker 222 thereby indicates a position of a discontinuity in the data visualization, where fragments of a portion of the data visualization that remain non-frozen and were previously separated by a portion of the data visualization that was subsequently frozen are positioned adjacent to each other. Visual marker 222 thereby may also provide additional context information on the data fragments and their relation to each other, that may help the user visualize the relationships among the data fragments during operations to manipulate the data visualization.

In the examples of FIGS. 4-7, freezing a data fragment includes automatically freezing a range of the data elements in the data visualization (e.g., the data columns in the column chart). In these and other examples, defining the frozen fragment of the data visualization may include freezing a range of data elements (e.g., data columns, bars, pie slices, etc.) bounded at a first end by a data element (e.g., a data column) indicated by a position of the pointer during a particular user input. In these particular examples, defining the frozen fragment of the data visualization also includes the range of data elements for freezing being bounded at an opposing end of the range from the first end by an edge of the data visualization, e.g., the left edge (e.g., the "time=0" edge or the origin of the x axis of a chart or graph), such that the range of data elements from a particular edge to the selected data element are defined as the frozen fragment.

In other examples, defining the frozen fragment of the data visualization may include freezing only one or more data elements indicated by one or more positions of the pointer during the first user input. In this case, all the rest of the data elements in the data visualization aside from the individually selected frozen fragments may also be joined in a circular data set for repositioning, with discontinuities only at the points where the individually frozen data elements are removed. This option of freezing only individually selected data elements may add further flexibility to a data visualization tool 22.

Applying this option for only individually selected data elements to modify the examples above with reference to FIGS. 4-7, a user may freeze the data column for week 9 alone, which leaves weeks 1-8 unfrozen. Data visualization tool 22 may visually indicate week 9 alone with a different color or other visibly different marker in the data visualization in the graphical user interface to show that week 9 alone is frozen. The user may then drag or reposition week 19 next to week 9, and the columns for weeks 1-8 and 10-18 may be circulated around the data visualization, with markers for a join between weeks 52 and 1, and for a discontinuity between weeks 8 and 10, indicating where the week 9 data column has been frozen out of the circulating data set. The user may then freeze week 19 in place next to week 9 and then drag or reposition the week 34 data column next to the week 9 data column. Data visualization tool 22 may then analogously represent week 19 as frozen, and display the weeks 20-33 data columns repositioned appropriately as part of the circulating data set, with another discontinuity marker between the weeks 18 and 20 data columns, indicating the prior relative position of the week 19 column.

Figure 8:
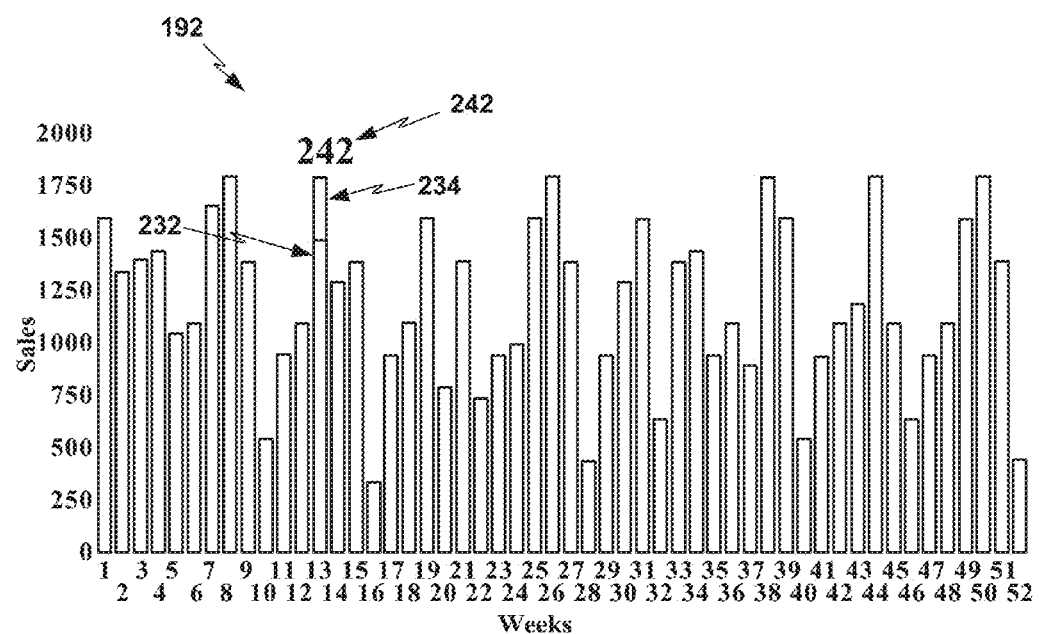
FIG. 8 depicts a column chart business data visualization being subjected to a data comparison operation to display superposed data bars with a delta display.

FIG. 8 shows an example of another data comparison mode enabled by data visualization tool 22, using a visual indicator of a delta display 234 (e.g., a visual indication of the delta or difference) between two data columns positioned in overlay or superposition together at the same position in a column chart 192. Data visualization tool 22 may display column chart 192 in response to a user input to superimpose two data columns directly on top of each other or in superposition together. For example, the user may drag a second data column on top of data column 232, where the second data column is for a larger value than data column 232 and occupies the area of data column 232 plus delta display 234 in the display of column chart 192. Data visualization tool 22 thereby shows the difference between two selected data columns, and corresponding value measures, in the form of delta 234, for directly visualized comparison of the corresponding data points.

Some examples for comparison modes in data visualization tool 22 with one data column overlaying or superimposed on another may render a delta highlighted in green if the data column on top (e.g., the dragged or repositioned data column) has a higher value than that of the underlying data column (e.g., the data column that remains stationary), and in red if the data column on top has a lower value than that of the underlying data column, as an illustrative example. The corresponding numerical difference in measure values may be explicitly shown in a displayed number 242 (with a displayed value of 242 in this example, which may correspond to a difference in weekly sales volume in thousands of U.S. dollars, as one example) adjacent to the corresponding highlighted delta display 234 of the column chart in some examples. The difference in measure values may be calculated using the formula for delta as shown above in Equation 1.

Data visualization tool 22 may generate the display of column chart 192 as shown in FIG. 8 in response to user inputs to superpose two data columns in a context similar to that of the examples discussed above in reference to FIGS. 3-7. In this example, the user may want to compare week 9 with week 19. The user may freeze the week 9 data column, then enter inputs for a "drag to compare" operation to reposition the week 19 data column on top of the week 9 data column. The values corresponding to the week 19 and week 9 values are 1646 and 1402 in this example, with a difference of 242. Data visualization tool 22 may display the call out value 242 (at 242) adjacent to delta display 234, and render the delta display 234 in green since the data column on top (for week 19) is for a data point with a higher value (i.e., 1646, higher than 1402 for week 9, displayed as data column 232).

The user may then want to compare week 10 with week 28. The user may freeze the week 10 data column, and use the "drag to compare" feature to reposition the week 28 data column on top of the week 10 data column (not shown in FIG. 8). The week 28 value may be 450 and the week 10 value may be 550, and data visualization tool 22 may show the delta display in red since the data point on top is lower. The data visualization tool 22 may also show a numerical call out display of the delta, −100, adjacent to the delta display in the column chart.

In some examples, a delta display may always be highlighted in one pre-defined color. The difference may be shown as a positive number with data point information, such as a category label. Other examples may use analogous techniques for freezing multiple axes in an appropriately applicable visualization, such as for freezing a section in a bubble chart.

In another example, a user may use data visualization tool 22 to compare sections of a pie chart, including by freezing portions of the pie chart and rotating other slices of the pie chart. For example, a user may want to compare contributions from, for example, twenty or more sales outlets, each with values rendered as pie slices in a pie chart. The user may want to compare the contributions of sales by two different sales outlets of interest. However, the slices corresponding to the two sales outlets may be widely separated in the pie chart. In this example, data visualization tool 22 may enable the user to freeze the pie slice for a first one of the sales outlets of interest in the pie chart and then bring the pie slice for the other sales outlet of interest either next to the first one, or in overlap or superposition to the first one, to enable an easy comparison of the difference between the two contributions. Data visualization tool 22 may also show a delta display pie slice showing the difference between two superposed pie slices, analogous to the column chart delta display discussed above and depicted in FIG. 8.

Data visualization tool 22 may be implemented in an application that may render data visualizations such as column charts, bar charts, and pie charts, and that may have a user input (e.g., mouse action) detection mechanism through which data visualization tool 22 receives an input indicating a particular data element that is subjected to a particular user input, e.g., a right-click and then a menu selection for a "freeze" option. An implementer may register such an input event by freezing the corresponding data fragment. An application implementing data visualization tool 22 may similarly provide support for drag and drop operations, which may be used to reposition widely separated data fragments closer to frozen data fragments. An application implementing data visualization tool 22 may also provide input options (e.g., in a toolbar) for other operations such as releasing the frozen fragments.

Figure 9:
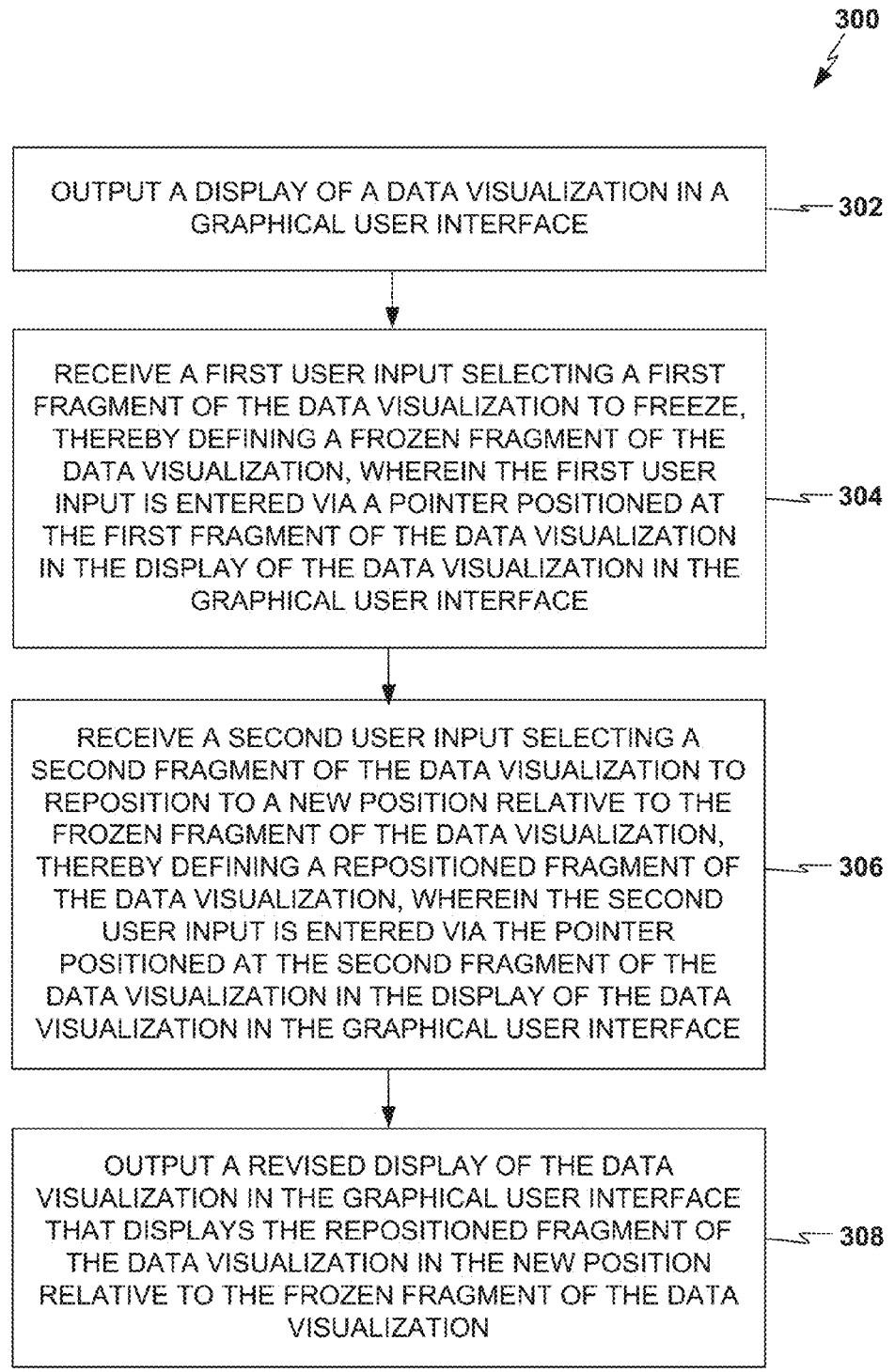
FIG. 9 depicts a process for manipulating a data visualization in response to user inputs in the graphical user interface of the data visualization that may be performed by a data visualization tool in a business intelligence (BI) system.

FIG. 9 depicts an example process 300 for manipulating a data visualization in response to user inputs in the graphical user interface of the data visualization that may be performed by a data visualization tool 22, executing on one or more computing devices, in a business intelligence (BI) system. Data visualization tool 22 may output a display of a data visualization in a graphical user interface (302). Data visualization tool 22 may receive a first user input selecting a first fragment of the data visualization to freeze, thereby defining a frozen fragment of the data visualization, wherein the first user input is entered via a pointer positioned at the first fragment of the data visualization in the display of the data visualization in the graphical user interface (304). Data visualization tool 22 may receive a second user input selecting a second fragment of the data visualization to reposition to a new position relative to the frozen fragment of the data visualization, thereby defining a repositioned fragment of the data visualization, wherein the second user input is entered via the pointer positioned at the second fragment of the data visualization in the display of the data visualization in the graphical user interface. Data visualization tool 22 may output a revised display of the data visualization in the graphical user interface that displays the repositioned fragment of the data visualization in the new position relative to the frozen fragment of the data visualization (308).

Figure 10:
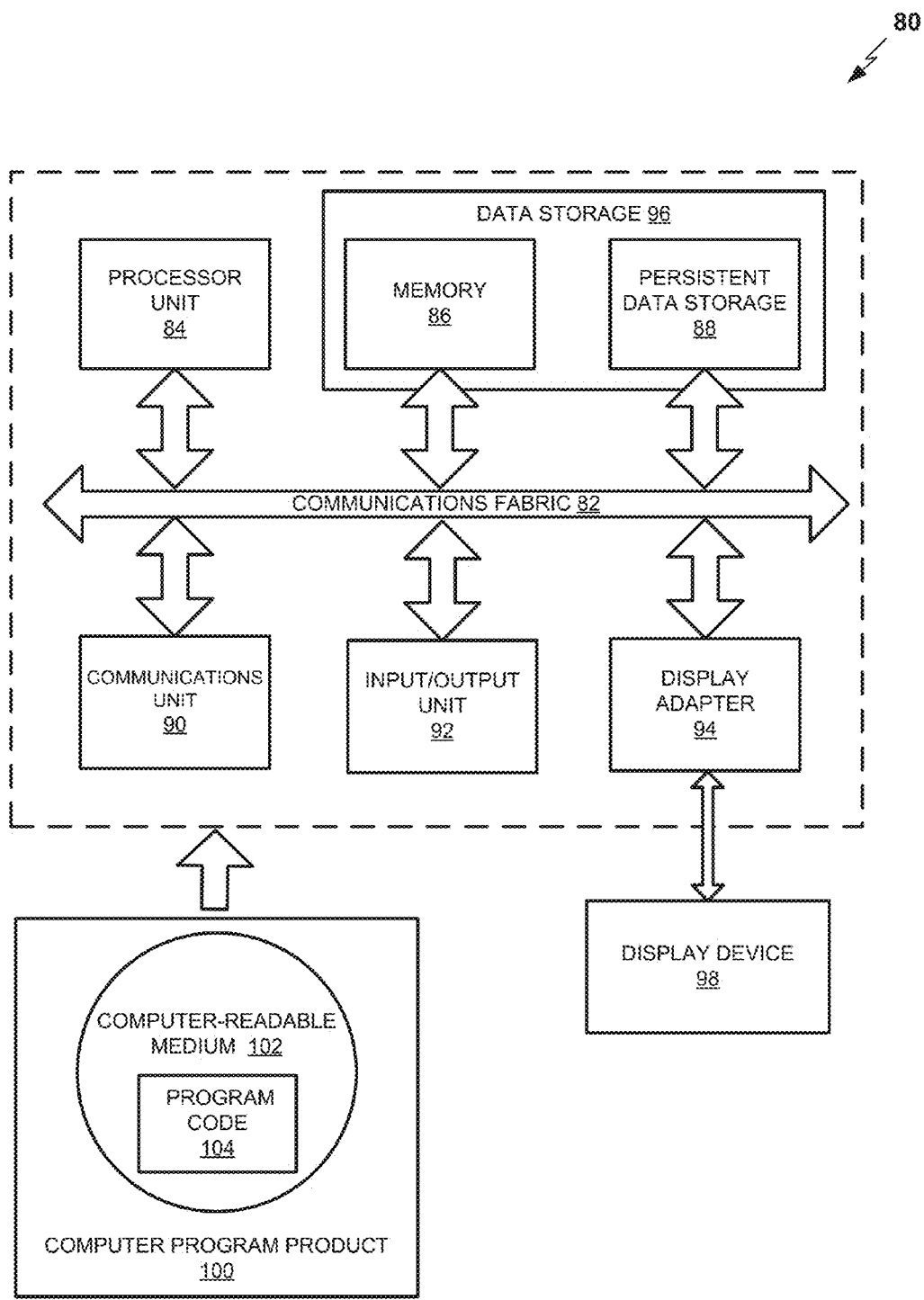
FIG. 10 is a block diagram of a computing device that may execute a data visualization tool for data comparison operations in a data visualization.

FIG. 10 is a block diagram of a computing device 80 that may be used to execute a data visualization tool 22, according to an illustrative example. Computing device 80 may be a server such as one of web servers 14A or application servers 14B as depicted in FIG. 2. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 10, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a data visualization tool 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, a mobile device operating system such as iOS® from Apple® Inc., or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorterrange direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

As will be appreciated by a person skilled in the art, aspects of the present disclosure may be embodied as a method, a device, a system, or a computer program product, for example. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible, non-transitory data storage medium, as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. A non-exhaustive list of additional specific examples of a computer readable storage medium includes the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

Program code embodied on a computer readable medium may be transmitted using any appropriate medium, including but not limited to radio frequency (RF) or other wireless, wire line, optical fiber cable, etc., or any suitable combination of the foregoing. Computer program code for carrying out operations for aspects of the present invention may be written in any combination of one or more programming languages, including an object oriented programming language such as Java, Smalltalk, C++, or the like, or other imperative programming languages such as C, or functional languages such as Common Lisp, Haskell, or Clojure, or multi-paradigm languages such as C#, Python, or Ruby, among a variety of illustrative examples. One or more sets of applicable program code may execute partly or entirely on the user's desktop or laptop computer, smartphone, tablet, or other computing device; as a stand-alone software package, partly on the user's computing device and partly on a remote computing device; or entirely on one or more remote servers or other computing devices, among various examples. In the latter scenario, the remote computing device may be connected to the user's computing device through any type of network, including a local area network (LAN) or a wide area network (WAN), or the connection may be made to an external computer (for example, through a public network such as the Internet using an Internet Service Provider), and for which a virtual private network (VPN) may also optionally be used.

In various illustrative embodiments, various computer programs, software applications, modules, or other software elements may be executed in connection with one or more user interfaces being executed on a client computing device, that may also interact with one or more web server applications that may be running on one or more servers or other separate computing devices and may be executing or accessing other computer programs, software applications, modules, databases, data stores, or other software elements or data structures. A graphical user interface may be executed on a client computing device and may access applications from the one or more web server applications, for example. Various content within a browser or dedicated application graphical user interface may be rendered or executed in or in association with the web browser using any combination of any release version of HTML, CSS, JavaScript, XML, AJAX, JSON, and various other languages or technologies. Other content may be provided by computer programs, software applications, modules, or other elements executed on the one or more web servers and written in any programming language and/or using or accessing any computer programs, software elements, data structures, or technologies, in various illustrative embodiments.

Aspects of the present invention are described herein with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, may create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices, to produce a computer-implemented process such that the instructions that execute on the computer or other programmable apparatus provide or embody processes for implementing the functions or acts specified in the flowchart and/or block diagram block or blocks.

The flowchart and block diagrams in the figures illustrate the architecture, functionality, and operation of possible implementations of devices, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may be executed in a different order, or the functions in different blocks may be processed in different but parallel processing threads, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of executable instructions, special purpose hardware, and general-purpose processing hardware.

The description of the present disclosure has been presented for purposes of illustration and description, and is not intended to be exhaustive or limited to the disclosure in the form disclosed. Many modifications and variations will be understood by persons of ordinary skill in the art based on the concepts disclosed herein. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims.

What is claimed is:

1. A method comprising:
receiving, by the computing device, a first user input selecting a first fragment of a chart to freeze, thereby defining a frozen fragment of the chart and a remaining portion of the chart as a non-frozen portion of the chart, wherein the chart is displayed in a graphical user interface and comprises a plurality of graphical data element representations that represent data points in a data visualization;
receiving, by the computing device, a second user input selecting a second fragment of the chart from the non-frozen portion of the chart to reposition to a new position in the chart relative to the frozen fragment of the chart, thereby defining a repositioned fragment of the chart, wherein graphical data element representations of the non-frozen portion of the chart are circulated between the frozen portion of the chart and an opposing end of the non-frozen portion of the chart, such that as one of the graphical data element representations of interest is being re-positioned to adjacency to the frozen fragment, graphical data element representations of the non-frozen portion of the chart that were previously positioned between the frozen portion and the selected portion are circulated around to an opposing end of the non-frozen portion of the chart; and
displaying, by the computing device, a visual indication of a position of a join in the chart, where the circulated fragment of the non-frozen portion of the chart and the opposing end of the non-frozen portion of the chart that were previously positioned at opposing ends of the non-frozen portion of the chart are positioned adjacent to each other.

2. The method of claim 1, further comprising:
displaying a visual indication of a boundary between the frozen fragment and a portion of the chart that remains non-frozen in the chart.

3. The method of claim 1, further comprising:
displaying a visual indication of a position of a discontinuity in the chart, where fragments of a portion of the data visualization that remain non-frozen and were previously separated by a portion of the chart that was subsequently frozen are positioned adjacent to each other.

4. The method of claim 1, further comprising:
enabling the first user input, for selecting the first fragment of the data visualization to freeze, by receiving a right-click input while the pointer is positioned at the first fragment of the chart, and displaying a context menu comprising a selectable option to freeze the data fragment.

5. The method of claim 1, further comprising:
enabling the second user input, for selecting the second fragment of the chart to reposition to a new position relative to the frozen fragment, by receiving a left-click input while the pointer is positioned at the second fragment of the chart, and displaying the second fragment in a modified position that corresponds to a modified position of the pointer.

6. The method of claim 1, wherein the chart comprises a column chart, the frozen fragment of the chart comprises one or more data columns of the column chart, and the repositioned fragment of the chart comprises one or more data columns of the column chart.

7. The method of claim 1, wherein the chart comprises a pie chart, the frozen fragment of the chart comprises one or more data pie slices of the pie chart, and the repositioned fragment of the chart comprises one or more data pie slices of the pie chart.

8. The method of claim 1, wherein the frozen fragment is a first frozen fragment and the repositioned fragment is a first repositioned fragment, the method further comprising:
receiving a third user input selecting a third fragment of the chart to freeze, thereby defining a second frozen fragment of the data visualization, wherein the third user input is entered via the pointer positioned at the third fragment of the chart in the display of the data visualization in the graphical user interface;
receiving a fourth user input selecting a fourth fragment of the chart to reposition to a new position relative to the first frozen fragment and second frozen fragment of the chart, thereby defining a second repositioned fragment of the chart, wherein the fourth user input is entered via the pointer positioned at the fourth fragment of the chart in the display of the chart in the graphical user interface; and
outputting a new revised display of the chart in the graphical user interface that displays the second repositioned fragment of the chart in the new position relative to the first frozen fragment and second frozen fragment of the chart.

9. The method of claim 1, further comprising:
receiving a third user input selecting the frozen fragment to release from freezing; and
outputting a new revised display of the chart in the graphical user interface that displays the repositioned fragment and the frozen fragment in positions in the chart previously occupied by the repositioned fragment and the frozen fragment prior to the freezing of the frozen fragment.

10. The method of claim 1, wherein defining the frozen fragment of the chart comprises freezing a range of data elements bounded at a first end by a data element indicated by a position of the pointer during the first user input.

11. The method of claim 10, wherein defining the frozen fragment of the chart further comprises the range of data elements for freezing being bounded at an opposing end of the range from the first end by an edge of the chart.

12. The method of claim 1, wherein defining the frozen fragment of the chart comprises freezing only one or more data elements indicated by one or more positions of the pointer during the first user input.

13. The method of claim 1, wherein the chart comprises graphical data element representations that represent financial metrics data over time.

14. The method of claim 1, wherein the chart comprises graphical data element representations that represent financial metrics data among a plurality of sales channels.

15. The method of claim 1, further comprising:
outputting a visual indication of a delta between the repositioned fragment and the frozen fragment in the revised display of the chart; and
outputting a displayed category label proximate to the visual indication of the delta, wherein the displayed category label indicates information on the repositioned fragment and the frozen fragment.

16. A computing system comprising:
one or more processors;
one or more computer-readable data storage devices; and
computer-executable program instructions, stored on the one or more computer-readable data storage devices for execution by the one or more processors, wherein the program instructions comprise:
program instructions for receiving a first user input selecting a first fragment of a chart to freeze, thereby defining a frozen fragment of the chart and a remaining portion of the chart as a non-frozen portion of the chart, wherein the chart is displayed in a graphical user interface and comprises a plurality of graphical data element representations that represent data points in a data visualization;
program instructions for receiving a second user input selecting a second fragment of the chart from the non-frozen portion of the chart to reposition to a new position in the chart relative to the frozen fragment of the chart, thereby defining a repositioned fragment of the chart, wherein graphical data element representations of the non-frozen portion of the chart are circulated between the frozen portion of the chart and an opposing end of the non-frozen portion of the chart, such that as one of the graphical data element representations of interest is being re-positioned to adjacency to the frozen fragment, graphical data element representations of the non-frozen portion of the chart that were previously positioned between the frozen portion and the selected portion are circulated around to an opposing end of the non-frozen portion of the chart; and
program instructions for displaying, by the computing device, a visual indication of a position of a join in the chart, where the circulated fragment of the non-frozen portion of the chart and the opposing end of the non-frozen portion of the chart that were previously positioned at opposing ends of the non-frozen portion of the chart are positioned adjacent to each other.

17. The computing system of claim 16, further comprising:
program instructions for displaying a visual indication of a boundary between the frozen fragment and a portion of the chart that remains non-frozen in the chart.

18. The computing system of claim 16, wherein the program instructions further comprise:
program instructions for displaying, by the computing device, a visual indication of a position of a discontinuity in the chart, where fragments of a portion of the chart that remain non-frozen and were previously separated by a portion of the chart that was subsequently frozen are positioned adjacent to each other.

19. A computer program product comprising executable instructions stored on a non-transitory computer-readable storage medium, for configuring one or more programmable processors to:
receive a first user input selecting a first fragment of a chart to freeze, thereby defining a frozen fragment of the chart and a remaining portion of the chart as a non-frozen portion of the chart, wherein the chart is displayed in a graphical user interface and comprises a plurality of graphical data element representations that represent data points in a data visualization; and
receive a second user input selecting a second fragment of the chart from the non-frozen portion of the chart to reposition to a new position in the chart relative to the frozen fragment of the chart, thereby defining a repositioned fragment of the chart, wherein graphical data element representations of the non-frozen portion of the chart are circulated between the frozen portion of the chart and an opposing end of the non-frozen portion of the chart, such that as one of the graphical data element representations of interest is being re-positioned to adjacency to the frozen fragment, graphical data element representations of the non-frozen portion of the chart that were previously positioned between the frozen portion and the selected portion are circulated around to an opposing end of the non-frozen portion of the chart.

20. The computer program product of claim 19, further comprising executable instructions stored on a non-transitory computer-readable storage medium, for configuring one or more programmable processors to:
  display a visual indication of a position of a join in the chart, where the circulated fragment of the non-frozen portion of the chart and the opposing end of the non-frozen portion of the chart that were previously positioned at opposing ends of the non-frozen portion of the chart are positioned adjacent to each other.

* * * * *